United States Patent
Cox et al.

(10) Patent No.: US 7,467,406 B2
(45) Date of Patent: Dec. 16, 2008

(54) EMBEDDED DATA SET PROCESSING

(75) Inventors: George Cox, Richmond, VA (US); Jeff Courington, Chester, VA (US)

(73) Assignee: NXP B.V., Eindhoven (NL)

( * ) Notice: Subject to any disclaimer, the term of this patent is extended or adjusted under 35 U.S.C. 154(b) by 1262 days.

(21) Appl. No.: 10/227,363

(22) Filed: Aug. 23, 2002

(65) Prior Publication Data

US 2004/0039939 A1    Feb. 26, 2004

(51) Int. Cl.
*G06F 15/16* (2006.01)

(52) U.S. Cl. .......................... 726/11; 713/176; 709/224

(58) Field of Classification Search .................. 726/11; 709/224; 713/176
See application file for complete search history.

(56) References Cited

U.S. PATENT DOCUMENTS

| | | | | |
|---|---|---|---|---|
| 5,606,668 A | * | 2/1997 | Shwed | 726/13 |
| 5,896,499 A | * | 4/1999 | McKelvey | 726/11 |
| 6,098,172 A | * | 8/2000 | Coss et al. | 726/11 |
| 6,157,955 A | * | 12/2000 | Narad et al. | 709/228 |
| 6,404,752 B1 | * | 6/2002 | Allen et al. | 370/335 |
| 6,598,034 B1 | * | 7/2003 | Kloth | 706/47 |
| 6,651,099 B1 | * | 11/2003 | Dietz et al. | 709/224 |
| 6,772,347 B1 | * | 8/2004 | Xie et al. | 726/11 |

* cited by examiner

*Primary Examiner*—Kambiz Zand
*Assistant Examiner*—William S Powers

(57) ABSTRACT

A hardware-based method and system classifies and processes data sets according to a set of rules. In one aspect of the invention, the operations associated with data set analysis and classification are offloaded from an interface processor to one or more embedded processors operating in parallel with the interface processor. A set of rules for classifying a data set is represented by instruction sequences stored in the embedded processors' memory. The embedded processors include data set parser logic to decompose data sets into relevant units and rules engine logic for executing the sequence of instructions to determine the classification of data sets. The rules engine logic returns the results of classifying the data sets to the interface processor.

55 Claims, 11 Drawing Sheets

Command Register

| Reserved | Single | Parse | Execute | Halt | Reset | IP Only | Reserved | Reserved | Start PC (high byte) | Start PC (low byte) |
|---|---|---|---|---|---|---|---|---|---|---|
| 31 - 24 | 23 | 22 | 21 | 20 | 19 | 18 | 17 | 16 | 15 - 8 | 7 - 0 |

Bit →

FIG. 8

Status Register

| Reserved | Parse Error | PC Underflow | PC Overflow | Bad Instruction | Stack Overflow | Stack Underflow | Halted | Single Step |
|---|---|---|---|---|---|---|---|---|
| 31 - 8 | 7 | 6 | 5 | 4 | 3 | 2 | 1 | 0 |

Bit →

FIG. 9

EMBEDDED DATA SET PROCESSING

RELATED PATENT DOCUMENT

This application is related to co-pending patent application entitled "HARDWARE-BASED PACKET FILTERING ACCELERATOR," U.S. patent application Ser. No. 10/227,368, concurrently-filed herewith and incorporated herein by reference in its entirety.

FIELD OF THE INVENTION

The present invention relates generally to data processing and, more particularly, to a method and system for classifying and processing data sets according to a set of rules using a hardware-based data set classification accelerator.

BACKGROUND OF THE INVENTION

Diversely interlinked data networks provide access to a vast array of information. Documents, pictures or videos may be retrieved through a network from a computer within the same building, or from a computer on the other side of the world. The explosion of information made available by networking computers drives the need for ever faster and more efficient ways to manage data processing.

Networking relies on communication protocols for processing streams of information transferred between network-connected computers. The information is typically transmitted in one or more data sets or data packets defined in accordance with a data communication protocol. Transmission Control Protocol/Internet Protocol (TCP/IP) is an example of a suite of communication protocols used for internet applications. TCP is the protocol used to establish a connection between two networked computers so that streams of data may be exchanged. TCP also establishes a method for ensuring delivery of the data and ensuring that information packets are delivered in the correct order. Internet protocol (IP) specifies the format of data packets, also called datagrams, transferred between networked computers. IP also specifies the addressing scheme used to transfer a data packet from one computer to another.

Widely networked systems present a number of challenges. For example, systems of disparate technologies must be interlinked using gateways or interface devices that provide a compatible communication protocol. The security of a private user or private network connected to a wide area network, including the largest wide area network, the internet, may be protected by virus detection and/or data security or encryption systems. Additionally, the vast amount of information available through networking must be meaningfully accessible through search engines or other data organization techniques.

Data sets, such as IP datagrams, may be examined, filtered, and reformatted to provide a user system or network with virus protection, intrusion detection, private network interconnectivity and text searching functionality. An intrusion detection system, such as a system implemented by a firewall, examines packets to filter messages that do not meet specified security criteria. A firewall may use a packet filter to inspect each packet entering or leaving the network. A packet is accepted or rejected based on a set of user-defined rules. The inspection may be implemented as a table lookup comparing various IP packet header fields to values in the table until either a matching entry in the table is found, or until no match is found and a default rule is selected. The disposition of the packet, as determined by the rule, determines whether a packet is forwarded, dropped silently, or dropped with a notification to the source host.

Another example of data set examination is the network translation required to connect a private network to the wider network. A local area network (LAN) may be connected to the internet through a central gateway device and using a Network Address Translation (NAT) implementation. The NAT translates between internal data traffic within the LAN and external data traffic to and from the internet. The NAT is located where the LAN meets the internet and makes the necessary IP address translations to the data packets. NAT implementations modify outgoing and incoming network packets to enable the interconnection between the two, possibly overlapping, address realms of the LAN and the internet. To distinguish between the LAN and internet addresses, NAT implementations keep a table of address mappings. When a packet is outbound from the LAN, the NAT software modifies the packet header so that the source address is the same as the gateway address. On inbound packets, the NAT software maps the destination address of the incoming packet (the gateway address) to the original source address based upon a NAT table lookup.

A virtual private network (VPN) provides another example of an implementation of data set examination and filtering. A virtual private network may constructed using public wires to connect nodes. These systems use encryption and other security techniques to ensure that only authorized users can access the network and that the information transferred through the VPN is secure. A VPN system must check packets in several ways, including checking to determine if an outbound packet must be encrypted, or to determine if an inbound packet is encrypted, or should have been encrypted. Each of these inspections requires the VPN application to compare the packet header information to a set of rules.

Typically, of the above examples of data set examination and analysis are implemented by a process that includes comparing portions of an information data set to a lookup table representing a predefined set of rules. As communication speeds increase, this task demands an increasing amount of system resources.

SUMMARY OF THE INVENTION

The present invention is directed to a method and system for processing data sets and has be found to be particularly useful for accelerating data set classification and processing to accomplish a number of data processing tasks including, for example, tasks relating to virus protection, intrusion prevention, network security, and text searching.

One embodiment of the present invention includes an interface circuit for processing data sets transferred between a source and a destination terminal in accordance with a set of rules. The interface circuit includes an interface processor arranged to process each data set according to a classification of the data set. The interface circuit further includes an embedded processor operating in parallel with the interface processor and configured to classify each data set in accordance with the set of rules and provide the result of the classification to the interface processor. A parallel bus couples the interface processor and the embedded processor and is arranged to deliver data sets from the interface processor to the embedded processor and to deliver the result of the classification from the embedded processor to the interface processor.

Another embodiment of the invention involves a method for processing data sets including transferring data sets from an interface processor to an embedded processor operating in parallel with the interface processor. The data sets are classified in the embedded processor in accordance with a set of rules. The results of the classification are provided to the interface processor and the data sets are processed in accordance with the results of the classification.

In a further embodiment of the invention, a system for embedded data set processing includes means for transferring data sets from an interface processor to an embedded processor operating in parallel with the interface processor, means for classifying the data sets in accordance with a set of rules, means for providing results of the classifications to the interface processor, and means for processing the data sets in accordance with the classifications of the data sets.

In yet another embodiment of the invention, a method for processing data sets according to a set of rules includes providing one or more embedded processors operating in parallel with an interface processor, the embedded processors classifying data sets using sets of rules and the interface processor processing the data sets in accordance with the classification of the data sets. The method further includes representing the set of rules as instruction sequences executable by the one or more embedded processors. Portions of the data sets are passed from the interface processor to the embedded processors and relevant data units are extracted from the data set portions. The embedded processors execute the instruction sequences to classify the data sets and report a classification of the data sets to the interface processor. The interface processor processes the data set in accordance with the classification of the data sets.

A further embodiment of the invention involves a system for processing data sets according to a set of rules. The system includes means for operating one or more embedded processors in parallel with an interface processor, means for representing the sets of rules as sequences of instructions, means for transferring the sequences of instructions to the embedded processors, means for passing portions of the data sets to the embedded processors. The system further includes means for extracting relevant data units from the data sets, means for executing the sequences of instructions to classify the data sets, means for reporting the results of the classification of the data sets to the interface processor and means for processing the data sets in accordance with the classifications of the data sets.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 8 is an illustration of the structure of a command word in accordance with an embodiment of the invention;

FIG. 9 is an illustration of the structure of a status word in accordance with an embodiment of the invention;

Figure 1:
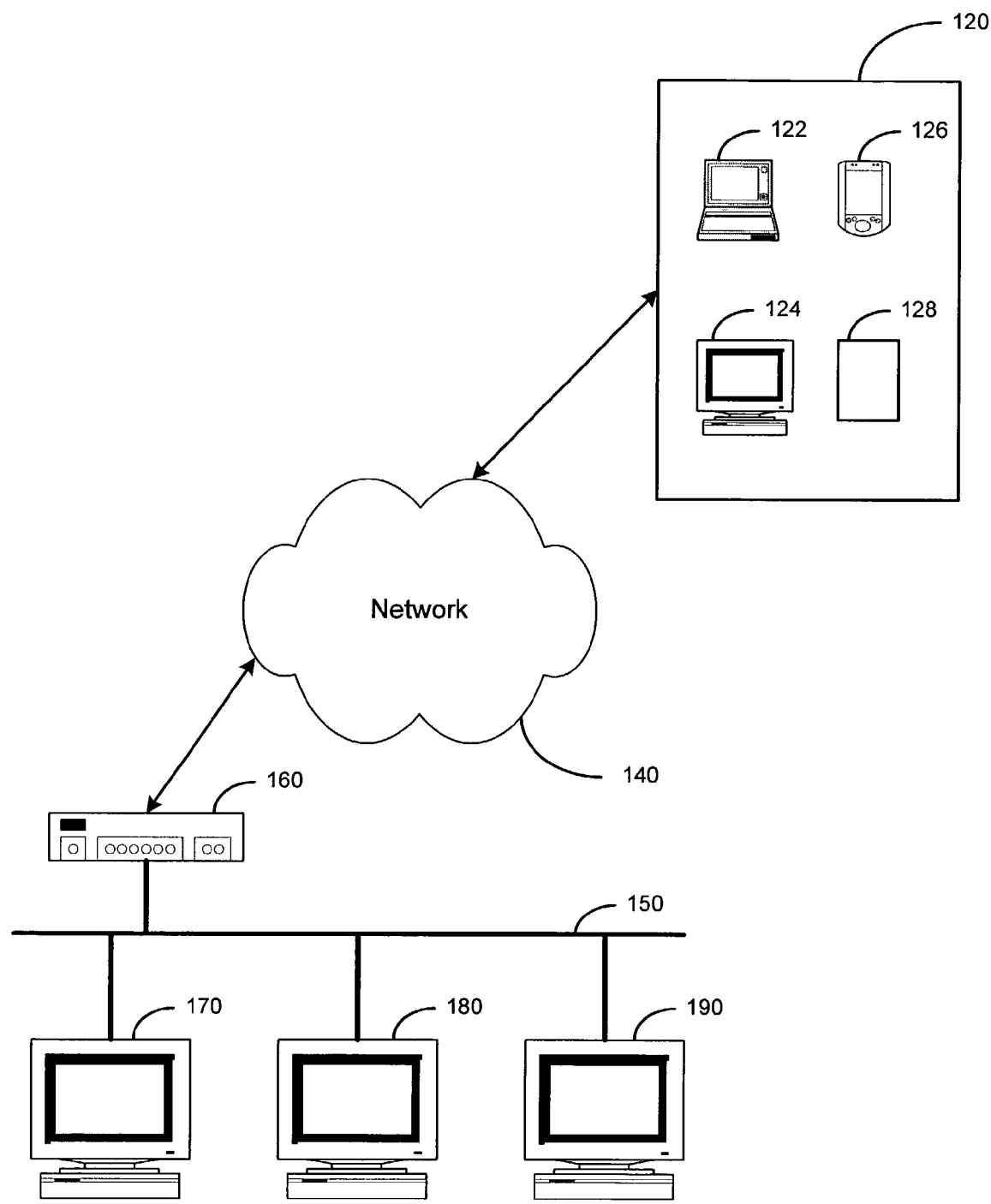
FIG. 1 is a diagram of a network with an interface circuit for classifying and processing data sets in accordance with an embodiment of the invention.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

In one embodiment, a data set processing system and method is implemented using a hardware-based accelerator to parse, examine and classify data sets in accordance with a set of rules. The data sets may be classified, for example, in accordance with various virus protection, content filter, source security, and text string search criteria. Other classification criteria may also be defined and data sets may be classified according the defined criteria by the methods of the invention. Data set classification operations have been typically performed by a network host interface processor running a software-based implementation to classify data sets. The invention described herein offloads the data set examination and analysis workload from the host interface processor by implementing data set classification functions in circuitry embedded within the host interface processor integrated circuit. The method and system of the present invention provides a flexible hardware accelerator for data set classification that implements high speed data processing operations for the network interface.

One aspect of the invention includes data set parsing circuitry to decompose the data set into component units. For example, a data set, such as an IP datagram, may be parsed into key fields that may be stored in one or more registers for processing.

Another aspect of the invention includes rules engine logic that executes a sequence of machine code instructions associated with a set of rules to classify a data set and return the results of the classification to the host interface processor. The invention provides a flexible hardware assist for data set classification that can be implemented as a system-on-a-chip solution.

Connectivity between various information processors may be implemented using a number of different network types, communication protocols, and interface devices. FIG. 1 provides an example of a general network architecture that may be used to accommodate data transfer between one or more data processing terminals in accordance with an embodiment of the invention. A source terminal 120 may transfer data, for example, data in the form of data sets or IP packets, over a wide area network, such as the internet 140, to one or more destination terminals 170, 180, 190. A terminal may be a laptop terminal 122, a desktop terminal, a wireless device 126, such as a personal data assistant (PDA), or any other type of data processing terminal 128. The destination terminals 170, 180, 190 may be arranged in a private network 150 accessible through an interface 160. The interface 160 may implement various data set analysis and processing tasks for virus protection, intrusion detection, security or private network address translation.

Figure 2:
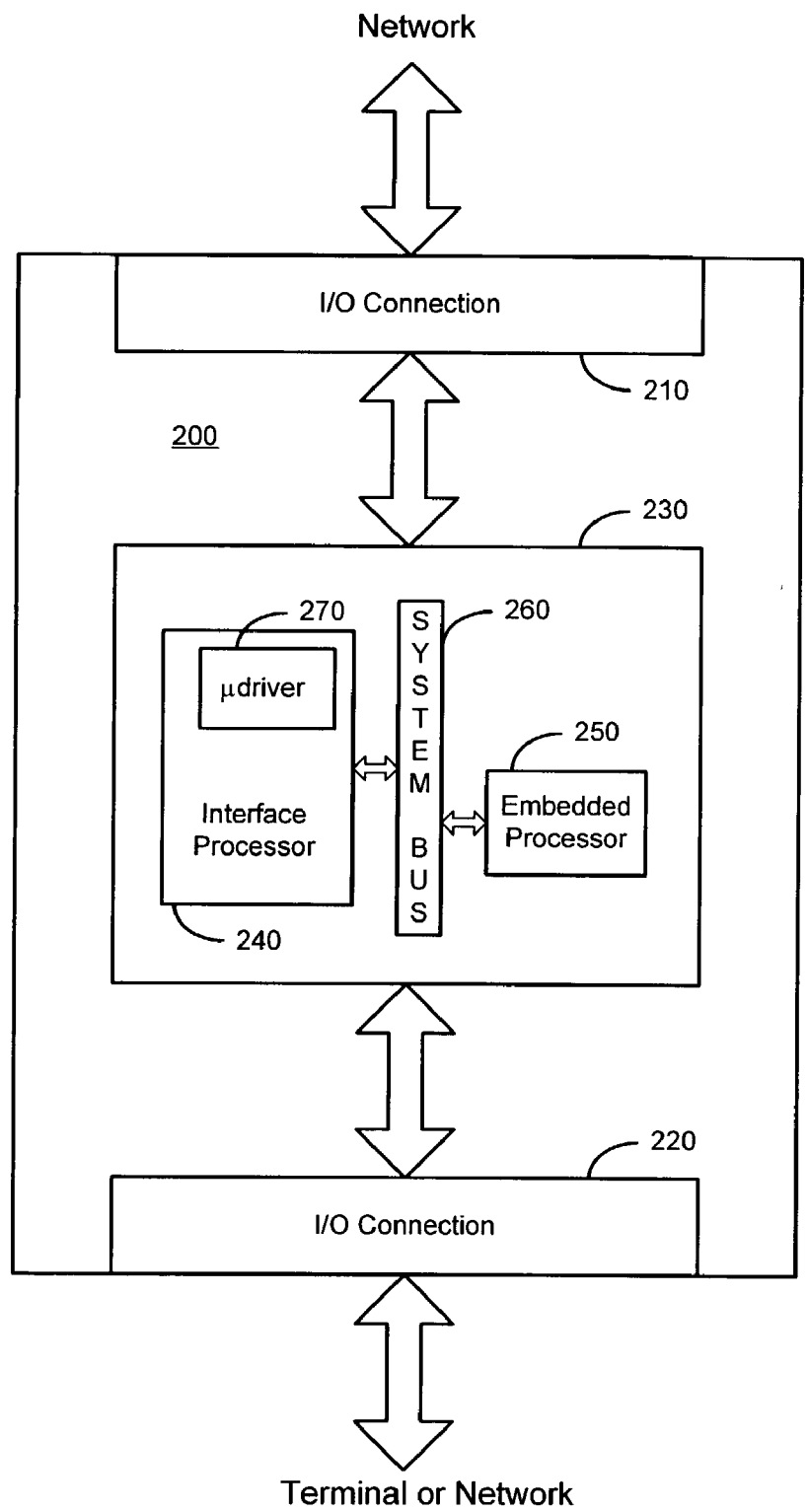
FIG. 2 is a block diagram of an interface circuit with a host interface processor and an embedded processor in accordance with an embodiment of the invention.

A block diagram of a network interface 200 in accordance with one example embodiment of the invention is illustrated in more detail in FIG. 2. The interface 200 may be interposed between a wide area network, such as the internet, and a private terminal or network through appropriate input/output connections 210, 220. The majority of the interface circuitry 230 may be incorporated in one or more integrated circuits coupled between the I/O connections 210, 220. In accordance with one embodiment of the invention, the interface circuitry 230 includes a host interface processor 240 and one or more embedded processors 250 coupled through a system bus 260. For example, the host interface processor 240 and the embedded processor may be arranged on an integrated circuit with the host interface processor 240 implemented using a processor core, such as an ARM or MIPS processor core, and coupled to the embedded processor 250 through a high speed parallel bus structure.

The host interface processor 240 and the embedded processor 250 are arranged to operate in parallel. In this configuration, the host interface processor 240 performs the bulk of data processing tasks. The embedded processor 250 offloads the tasks of data set parsing and classification from the host interface processor 240, thereby freeing the host interface processor 240 from a portion of the time-consuming processing overhead associated with the data set parsing and classification operations.

The host interface processor 240 includes a microdriver 270, for managing the one or more embedded processors 250 coupled to the host interface processor 240. The microdriver 270 operating within the host interface processor 240 provides an interface for controlling the operation of one or more embedded processors 250. The microdriver 270 is configured to control the communication between the one or more embedded processors 250 and the host interface processor 240, and to manage the rule sets applied by the embedded processors 250. For example, the microdriver 270 may initiate and terminate the use of an embedded processor 250, copy embedded processor registers to the host interface processor 240 or overwrite the contents of the embedded processor registers with alternate values.

The microdriver 270 transforms one or more sets of rules to be applied to the data sets into machine code executable by the one or more embedded processors 250. The rules may be modified by the microdriver 270 as required. The microdriver 270 may produce rules machine code representing rule sets based upon the current data set, or based upon the expected reply to the current data set, for example, to open return holes in a firewall. The rules machine code prepared by the microdriver 270 may be downloaded from the host interface processor 240 to an instruction cache located within the embedded processor 250. The microdriver 270 also provides the ability to add or remove individual rules from an embedded processor's instruction cache, as well as to occasionally compact the machine code to eliminate machine code representing obsolete rules.

In one embodiment, the microdriver 270 manages two types of rule sets, linear rule sets and tree rule sets. A linear rule set is suited for analyzing a data set against a defined set of rules where the order of the rules is critical. When the embedded processor 250 analyzes a data set against a linear rule set, the data set is compared to the rules linearly through the list of rules, starting with the first rule and continuing through the rules until either a rule matches the data set or comparison of the data set to the rule set is complete. One example of a linear rule set is testing a network packet against a statically defined set of packet filter rules.

A rule set may have additional rule sets chained from the rule set. The chained rule sets may be linear or tree rule sets. In many applications, a rule set consists of a preamble of several linear rules, followed by a large tree rule set. A tree rule set is suited for analyzing a data set against a large table of rules where the order of rule examination is not important. An example of a tree rule set is a NAT table where the applicable rule is determined by quickly searching the tree using an IP address, IP port and protocol as key values.

The microdriver 270 may maintain multiple sets of rules for each of multiple embedded processors 250 that may be coupled to the host interface processor 240. The microdriver 270 maintains a synchronized copy of each program of machine code instructions representing the rule sets stored in each embedded processor 250. The microdriver 270 is capable of organizing the machine code instructions in the embedded processors 250 and may insert and remove instructions corresponding to various rules. Instructions may be rearranged so that instructions corresponding to obsolete or unused rules are removed from the one or more embedded processors 250.

Figure 3:
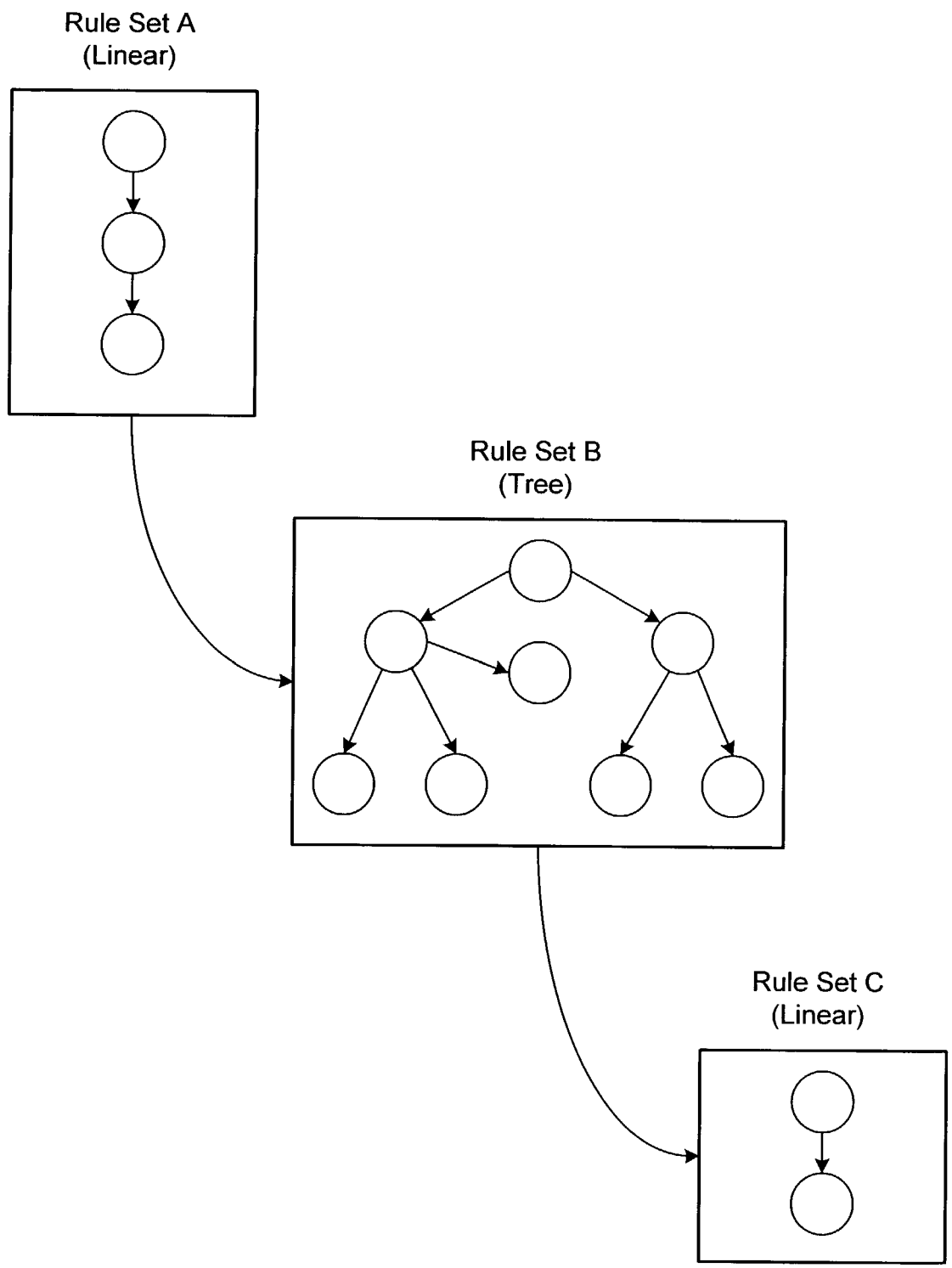
FIG. 3 is an illustration of chained linear and tree rules sets in accordance with an embodiment of the invention.

FIG. 3 is an example illustrating analysis of a data set using both linear and tree rule sets. A data set is first analyzed in relation to Rule Set A. If the data set is analyzed against Rule Set A and does not match any rules in Rule Set A, then the data set is analyzed against Rule Set B. If no matching rule is found in Rule Set B, then the data set is analyzed against Rule Set C. Rule Set C ends in an absolute rule that matches all data sets and the classification is complete. The embedded processor returns the result of the classification to the host interface processor.

Figure 4:
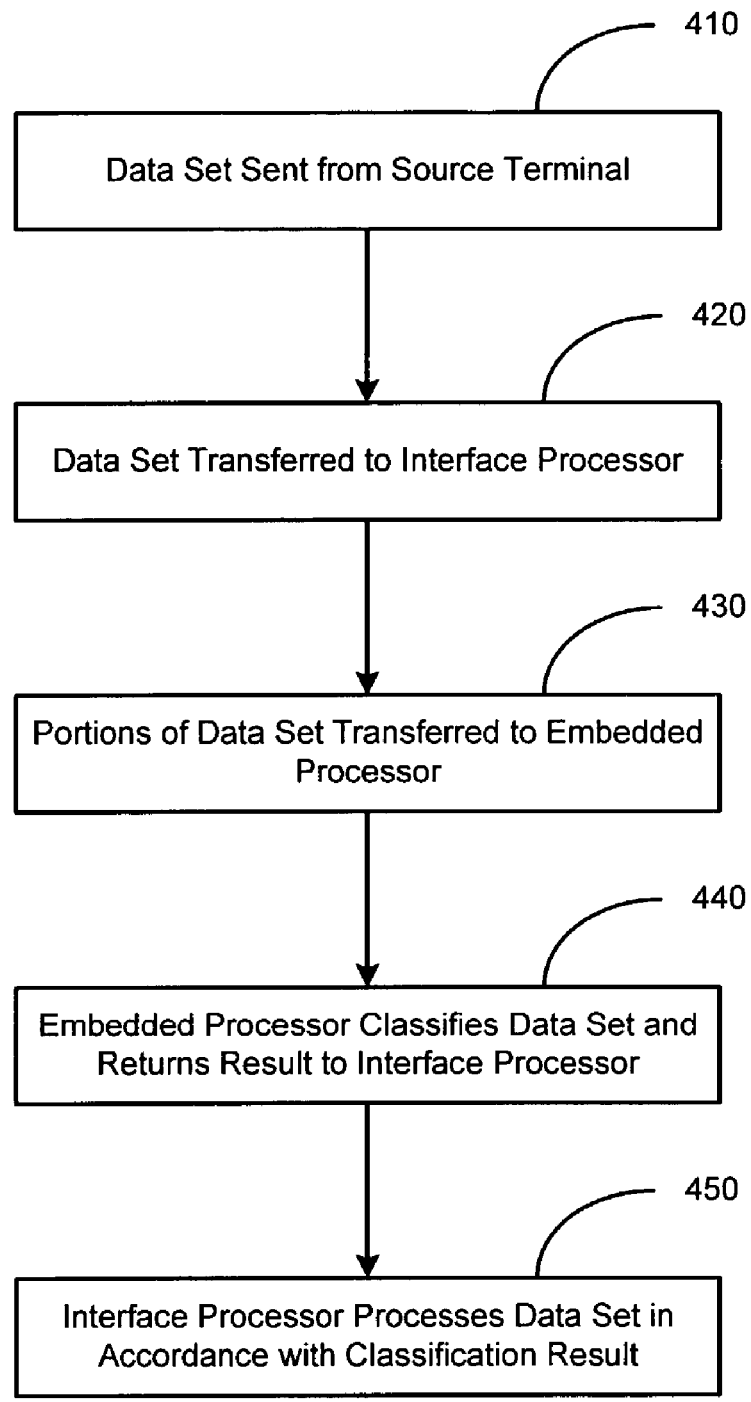
FIG. 4 is a flowchart illustrating data set classification and processing according to an embodiment of the invention.

The flowchart of FIG. 4 illustrates the disposition of a data set as it traverses the interface system. A data set is transmitted from a source terminal directed to a destination terminal 410. The data set arrives at the host interface processor for processing 420. The host interface processor transfers a portion of the data set to the embedded processor operating in parallel with the host interface processor 430. For example, the header of an IP packet may be transferred to the embedded processor. The embedded processor classifies the data set and notifies the host interface processor of the result of the classification 440. The host interface processor processes the data set in accordance with the classification provided by the embedded processor 450.

Figure 5:
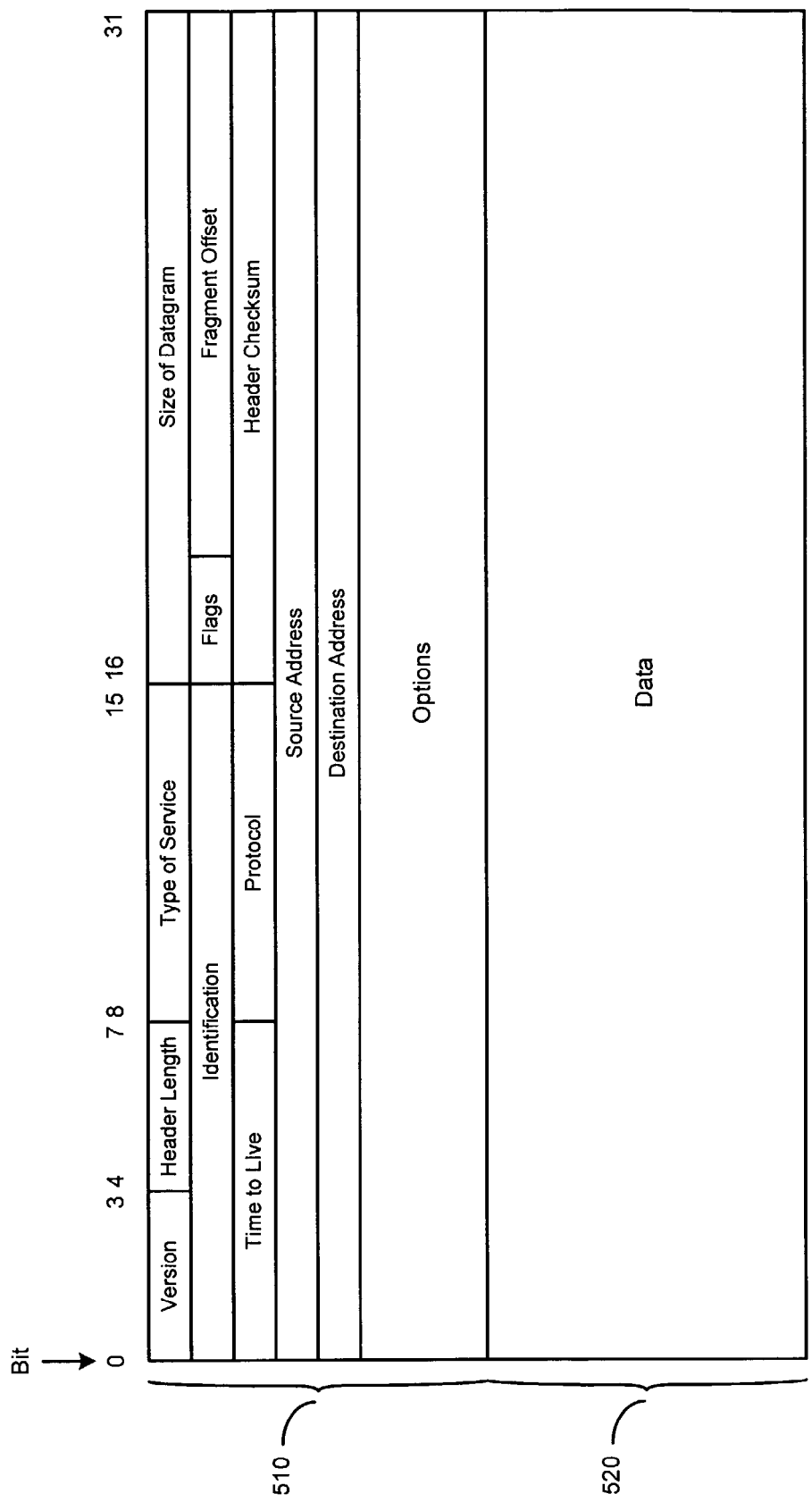
FIG. 5 is a block diagram of an embedded processor for classifying data sets in accordance with an embodiment of the invention.

The structure of an example data set is illustrated in FIG. 5. Although the data set illustrated is consistent with an IP packet, data sets arranged according to any structure may be classified and processed according to the methods of the invention. The IP packet illustrated in FIG. 5 may be considered to have two main sections, a packet header section 510 and a data section 520. The entire packet, including the header 510 and data 520 portions, is denoted a datagram. The packet header 510 is typically twenty bytes in length. Although an IP packet header includes an options section, this section may be unused. An explanation of the IP packet header fields is provided below in Table 1.

TABLE 1

| | |
|---|---|
| Version | The current version of internet protocol (IP) |
| Header Length | Specifies number of 32-bit words forming the header (usually five) |
| Type of Service | Indicates the particular quality of service needs from the network |
| Size of Datagram | The combined length of the header and data |
| Identification | A 16-bit number that, together with the source address uniquely identifies the packet. The ID is used during reassembly of fragmented datagrams |
| Flags | Used to control whether routers are allowed to fragment a packet and to indicator the parts of a packet to the receiver |
| Fragment Offset | A byte count from the start of the original sent packet set by any router that performs fragmentation |
| Time to Live | Number of links that the packet may be routed over, decremented by most routers and used to prevent accidental routing loops |
| Protocol | Indicates the type of packet being carried (e.g. ICMP, TCP, UDP, etc. |
| Header Checksum | 2's compliment checksum inserted by the sender and updated when modified by a router. |
| Source Address | The IP address of the original sender of the packet |
| Destination Address | The IP address of the final destination of the packet |
| Options | This field is not normally used |

Figure 6:
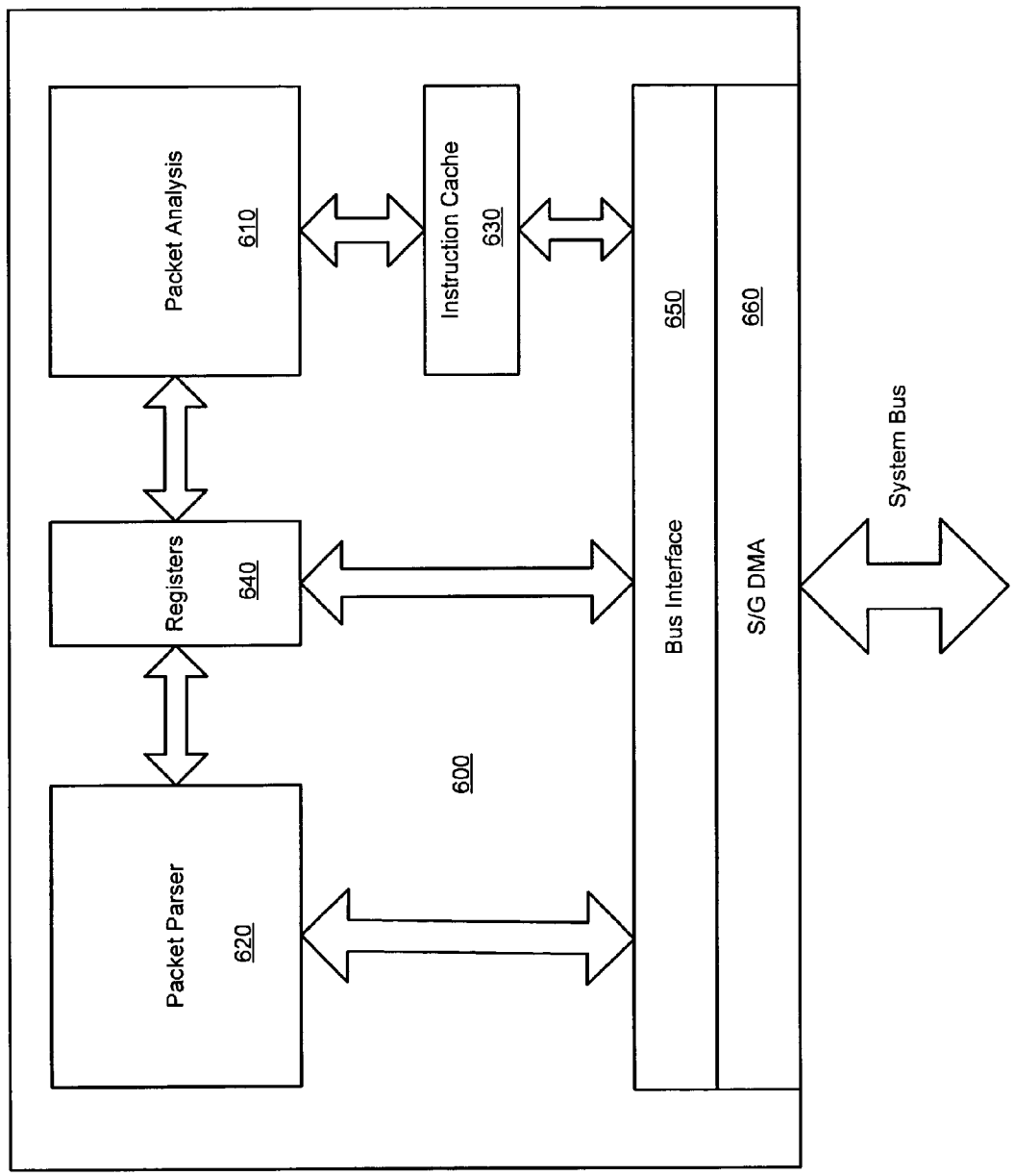
FIG. 6 is an example illustration of a data set structure.

The structure of the embedded processor is illustrated in more detail in the block diagram of FIG. 6. The embedded processor 600 provides rules engine logic 610, implemented as a very reduced instruction set computer (vRISC), closely linked with hardware-based data set parser logic 620. A program of machine code instructions representing the set of rules used to classify the data set is stored in an instruction cache 630 located within the embedded processor memory. The data set parser logic 620 decodes the data set and places relevant values of the data set, for example, the source and destination addresses, into one or more registers 640. The vRISC rules engine 610 executes a simple program of machine code instructions to classify the data set based on the parsed relevant data units stored in the registers 640.

The host interface processor has access to the data set parser logic 620, registers 640, and instruction cache 630 through a bus interface 650. The bus interface may be coupled through direct memory access (DMA) such as a scatter/gather DMA 660 to feed data set information from the host interface processor (not shown) to the data set parser logic 620.

Figure 7:
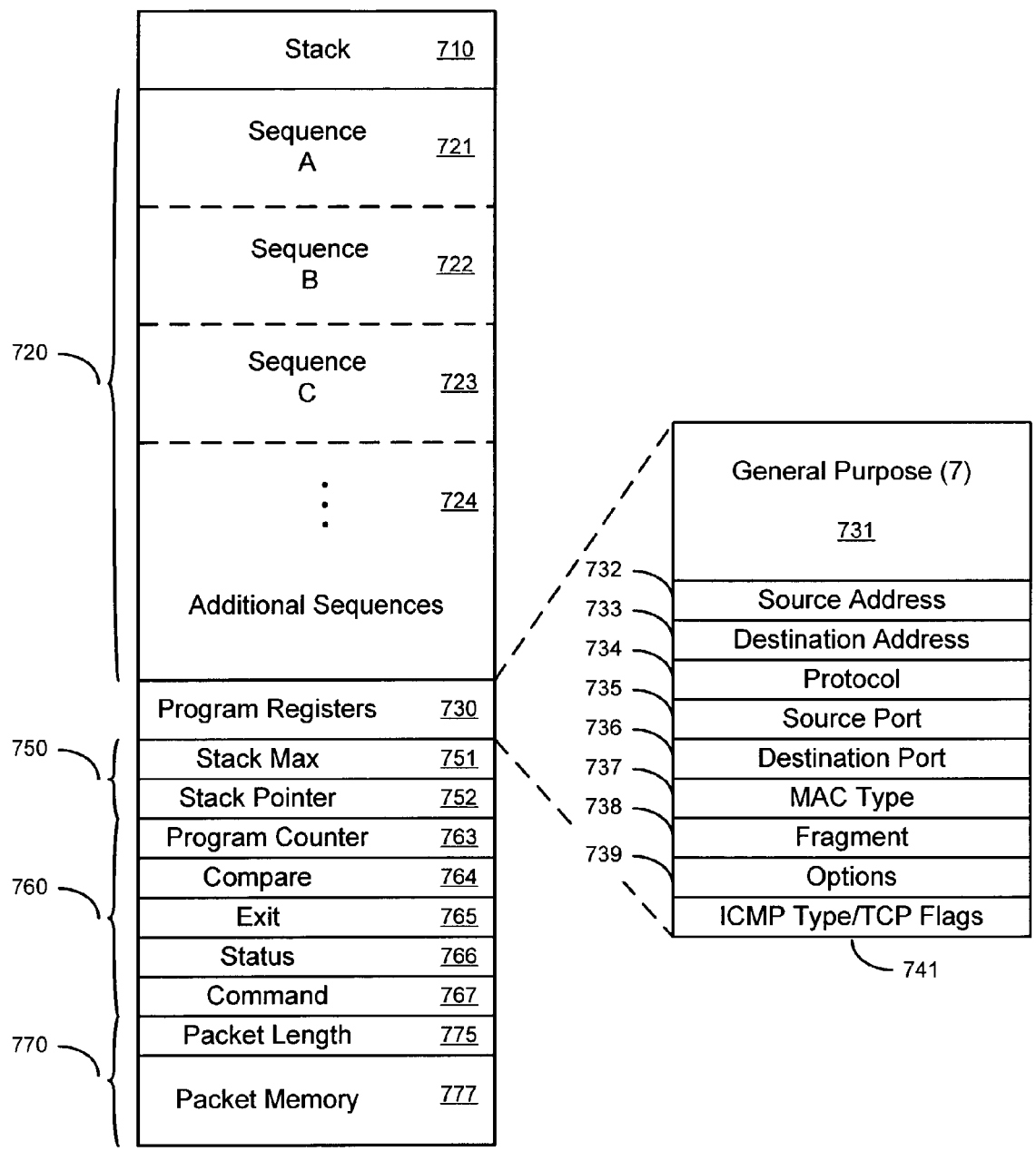
FIG. 7 is a memory map of an embedded processor for classifying data sets in accordance with an embodiment of the present invention.

An illustration of a memory map of the embedded processor memory is provided in FIG. 7. Embedded processor memory may be broadly divided into a stack 710, program memory 720, sixteen program registers 730, two stack control registers 750, four program control registers 760 and two memory control registers 770.

The embedded processor stack 710 is a push-down stack located at the top of memory. Stack control is determined by the stack control registers 750. The size of the stack is determined by a StackMax register 751 in the embedded processor memory. Each value pushed onto the stack is represented as a 32-bit unsigned value. If the value being pushed is a 16-bit value, then the most significant 16-bits of the pushed stack entry are represented as zeros. Initially, the stack pointer register 752 contains a value of zero, and as each value is pushed onto the stack, the stack pointer register 752 is incremented by four bytes. If the stack pointer register 752 increments past the value in the StackMax register 751, or decrements below zero, program execution is halted, the error is recorded in a status register 756, and an interrupt delivered to the host interface processor.

The machine code instruction sequences representing the rules to be applied to data sets by the rules engine vRISC are organized in one or more instruction sequences 721, 722, 723 located in the program section 720 of the embedded processor memory. A rule may consist of a group of comparison operations and other related operations performed using values found in the data set, including the relevant data units stored in the registers of the embedded processor. The host interface processor indicates to the embedded processor where instruction sequence execution should start by writing to a command register 767. The starting point of instruction sequence execution is dependent on the rule or rules being applied to the data set. For example, analysis of a first data set according to one rule set may require the execution of machine code instruction sequence to proceed from the beginning of instruction sequence A 721. To analyze a second data set, or to further analyze the first data set, the execution of instructions may start at a different location in memory associated with the beginning of instruction sequence B 722.

In an example embodiment, the embedded processor uses sixteen 32-bit registers 730 for various operations in connection with data set analysis. Seven registers are general purpose and may be accessed by the embedded processor or the host interface processor. Nine special purpose registers, described in Table 2, are used by the data set parsing logic to store relevant data units. Although the exemplary embodiment of the invention is described using a data set with a structure consistent with an IP packet, the data set analyzed and classified by methods of the invention need not conform to the particular structure of an IP data packet.

TABLE 2

| Register | Description |
|---|---|
| Source Address | Stores the source address of the IP packet. |
| Destination Address | Stores the destination address of the IP packet. |
| Protocol | Stores the code for the IP protocol used by the packet. The protocol field only consumes the first 8 bits of the register. |
| Source Port | Stores the source port for the packet if the packet is a user datagram protocol (UDP) or transport control protocol (TCP) packet. The source port value consumes the first 16 bits of the register. If the packet is not TCP or UDP, then the value of this register is undefined. |
| Destination Port | Stores the destination port for the packet if the packet is a UDP or TCP packet. The destination port value consumes the first 16 bits of the register. If the packet is not TCP or UDP, then the value of the register is undefined. |
| MAC type | Stores the media access control (MAC) type field from an Ethernet frame. |
| Fragment | Stores the fragment number and the more fragments bit from the current IP Packet. This register will be nonzero if the packet is part of a fragment. |
| Options | Stores a bit vector indicating the option types present in the packet. |
| ICMP type/TCP flags | Stores the value of the internet control message protocol (ICMP) type field if the packet is an ICMP packet. Stores the value of the TCP flags field if the packet is a TCP packet. |

Memory control registers 770 are used to control the transfer of a data set to the embedded processor memory. The data set length register 775 specifies the number of bytes of the data set that will be written to the embedded processor memory. The packet memory register 776 provides the location to which the host interface processor, or the DMA controller, may write to the embedded processor memory.

Program control registers 760 include the program counter 763, compare register 764, exit register 765, status register 766, and command register 767. The program counter 763 is used to control the sequence of instruction execution. The value of the program counter is the address of the memory location containing the next instruction to be executed by the rules logic vRISC.

The exit register 765 and the compare register 764, are not directly accessible by the embedded processor programs, but are accessible by the host interface processor. The compare register 764 contains the results of the last comparison instruction performed by the rules logic vRISC and is the only signed register in the system. The exit register 765 is set by an exit instruction executed by the rules logic vRISC and is used to pass a return value to the host interface processor.

The command register is a 32-bit register writable by the host interface processor and used for commands directed from the host interface processor to the embedded processor. The status register is a 32-bit register used to indicate to the host interface processor various error conditions than may occur during processing. The command and status registers are illustrated in FIGS. 8 and 9, respectively.

When the host interface processor writes to the command register, execution of the command by the rules logic vRISC is triggered. Bits 16-17 and 34-31 of the command register are reserved. Bits 18-23 are command bits used to control the operations of the embedded processor as described more fully below.

When the Single bit is set in the command register, the embedded processor operates in single-step mode for debugging embedded processor programs. When the single bit is set in the command register, the embedded processor will execute one instruction and halt. The embedded processor sets the halt bit in the status register, and interrupts the host interface processor signaling completion of the single step operation.

The parse bit in the command register may be used by the host interface processor in conjunction with the execute bit. When the parse bit is set in the command register, program execution by the embedded processor is stalled until the next data set is parsed. The parse bit is ignored unless the execute bit is set. The execute bit instructs the embedded processor to begin executing the program beginning at the location indicated by the StartPC bits. The halt bit commands the embedded processor to halt execution of a currently executing program. When the reset bit is set, the embedded processor resets the contents of the instruction memory and all the registers. Setting the IPonly bit commands the embedded processor to treat the arriving packet as having no Ethernet header. In this situation, the first byte of the packet must be the first byte of the IP header. If the IPonly bit is not set, then the parsing logic expects the first 14 bytes of a data set to be an Ethernet header.

The status register may be used to indicate that a parse error has occurred, to indicate program counter overflow or underflow, that a bad instruction was encountered by the embedded processor, stack overflow or underflow, the halt condition, or single step mode. If a status bit is set to 1, the error condition coded by the particular status bit has occurred.

The registers described above represent an exemplary set of registers that may be implemented to perform data set analysis and classification in accordance with the present invention. A different number of registers may be used to store these or other data set values to accomplish data set classification. Furthermore, the invention is not limited to the exemplary set of commands described herein to perform data set classification. A different command set may be implemented to accomplish a wide variety of tasks associated with data set analysis in accordance with the methods and systems of the present invention.

In one exemplary embodiment, the rules engine logic vRISC may implement a set of nine operations to analyze and classify a data set. According to this example, each operation is defined by an instruction that is one byte in length. An instruction may have an operand included within the instruction. Alternatively, the instruction may have operands that must be pulled from the stack, or operands that follow the instruction in program memory.

The instruction sequence representing a set of rules to be applied to a data set resides in the embedded processor memory which is freely readable and writable by the host interface processor. The host interface processor may write new programs into memory for each data set that is processed. The embedded processor memory may contain multiple programs for analyzing data sets of different type, or analyzing a data set or multiple data sets in different ways.

A instruction sequence executes until an exception occurs or until an exit instruction is executed. An exception may be generated upon conditions such as a stack overflow, stack underflow, or invalid instruction. When an exit or exception occurs, the host interface processor is signaled through an interrupt that the data set analysis is complete. The host interface processor may then query the exit register and other registers in the embedded processor memory to retrieve the results of the analysis. A description of an exemplary rules logic vRISC instruction set is provided below with reference to Table 3.

TABLE 3

| Instruction | Options/Operands |
|---|---|
| Noop | None |
| Push | 16-bit value which follows in stream |
|  | 32-bit value which follows in stream |
|  | Duplicate top of stack |
|  | Push contents of a register |
|  | Push work or half work from packet |
| Compare | 16-bit compare |
|  | 32 bit compare |
| Jump | Result equal |
|  | Result not true |
|  | Result greater than |
|  | Result less than |
|  | Result greater than or equal |
|  | Result less than or equal |
|  | Jump always |
| And | 16-bit And |
|  | 32-bit And |
| Exit | Return value may be located in a register, the next 32 bits in the instruction stream, or at top of the stack. |
| Store | Store 16-bit value |
|  | Store 32-bit value |
|  | Target register |
|  | Value to be stored may be in-line data |
|  | Value to be stored may be stack data. |
| Pop | none |
| Split | none |

Stack operations include Push and Pop instructions. A Push instruction pushes a new value onto the stack. The value may be a 16-bit or 32-bit value. The value may be a contained in a register, the next 16 or 32 bits of memory, a word from the data set or a value contained in the top of the stack. If the value to be pushed is located in a register, then the entire 32 bits of the register is pushed. If the value is to be pushed is contained in instruction memory, either the next 16 bits or the next 32 bits is pushed as a 32-bit value. If the value is a word from the data set, then the value at the top of the stack is popped and the value popped from the stack is used as the byte offset defining the location of the word from the data set to be pushed. If the value to be pushed is the top of the stack, then the top of the stack is popped off and pushed twice. A Pop instruction removes a 32-bit value from the stack.

A Compare instruction compares two 16-bit or two 32-bit values and stores the results of the comparison in the compare register. The values to be compared may come from the stack, from memory, or both. The comparison operation subtracts the second value form the first value and stores the difference in the compare register. If the values compared are equal, the compare register will contain zero after the compare instruction is executed. If the first value is greater than the second value, the compare register will be positive, and if the first value is less than the second value, the compare register will be negative after the compare instruction is executed.

A Jump instruction causes the program counter to be changed depending upon the value in the compare register derived from a prior comparison instruction. A jump may be executed in the following modes: jump always, jump less than, jump greater than, jump less than or equal to, jump greater than or equal to, jump equal, and jump not equal. The jump instruction uses the next 16 bits in the instruction memory as a signed integer indicating the jump offset.

An And instruction performs a 16-bit or 32-bit bitwise logical and of two values. The two values may either be on the stack, in the instruction sequence, or a combination of both.

The Exit instruction halts execution of the program and signals the host interface processor that the data set analysis is complete. A value returned by the exit command may be a register value, the next 32 bits in the data set, or the value on the top of the stack. The value returned by the exit register points to a register or memory location that stores the results of the data set classification.

A Store instruction causes the program to store a value into a register. The return value may be a 16-bit unsigned value or a 32-bit signed value. In either case, the entire contents of the register are overwritten by the value stored. If a 16-bit value is stored, the high-order 16-bits of the register are set to zero. The value stored may either be the top value on the stack, or the next value in instruction memory.

The Split instruction causes the program counter to jump the amount represented by the first half-word following the instruction if the compare register indicates that the last compare produced a value is less than zero. The Split instruction causes the program counter to jump the amount represented by the second half-word following the instruction if the compare register indicates that the last compare produced a value that is greater than zero. The Split instruction does nothing if the last compare produced a value equal to zero.

The paragraphs above describe an exemplary set of instructions that may be used for data set analysis. Additional instructions may be required or desired to accomplish a wide variety of data set analysis implementations within the scope of the invention.

Figure 10:
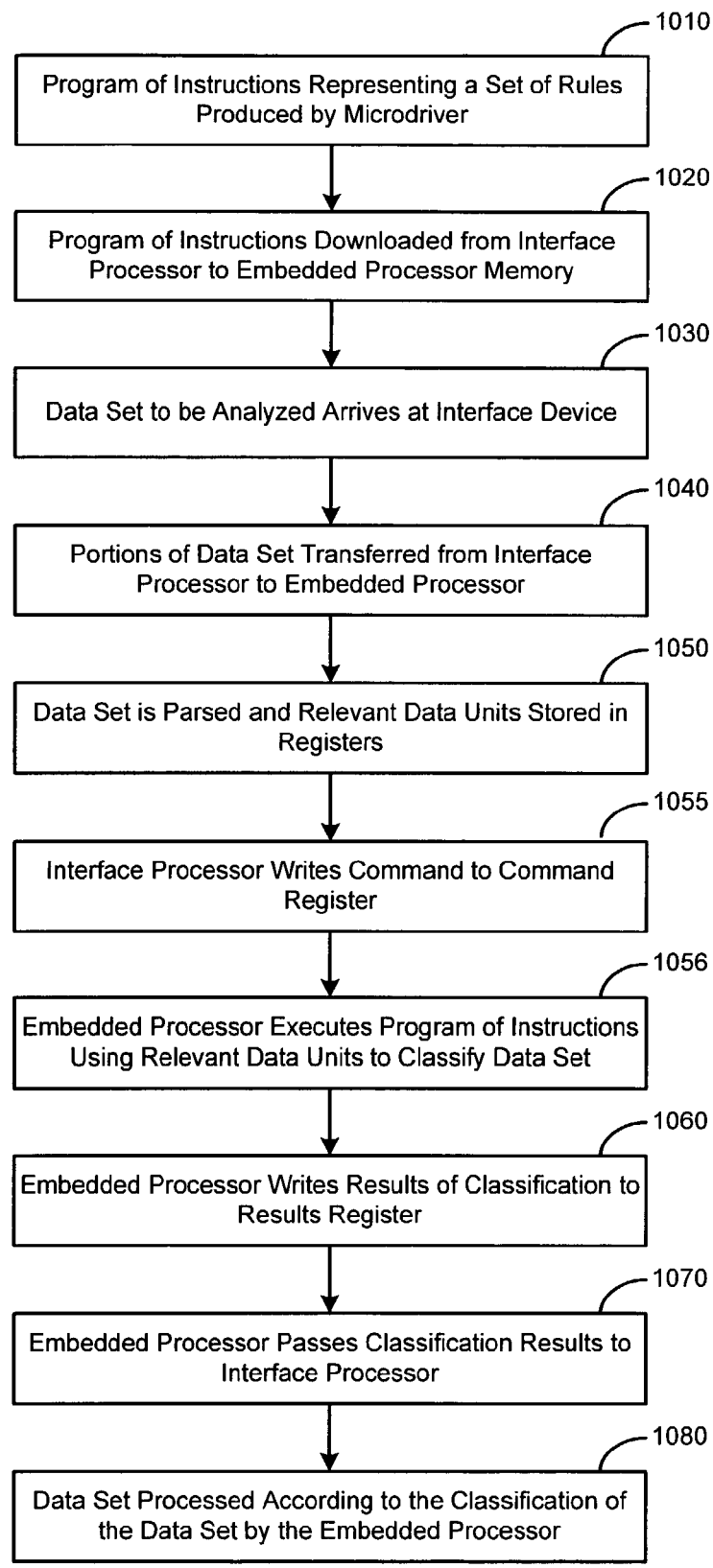
FIG. 10 is a flowchart of a method of classifying a data set in accordance with an embodiment of the invention.

A flowchart of a method of data set analysis in accordance with an embodiment of the invention is illustrated in FIG. 10. A microdriver implemented in the host interface processor produces program of instructions representing a one or more sets of rules for classifying data sets 1010. The program of instructions is downloaded from the host interface processor to the instruction cache of the embedded processor 1020. An incoming data set arrives at an I/O connection of the interface circuitry 1030. The data set may arrive for example, from a source computer coupled to the interface circuitry through the internet, as illustrated in FIG. 2. One or more portions of the data set are transferred from the host interface processor to the embedded processor 1040. In one example, only the header portion of the data set is transferred to the embedded processor. In another example, the header and a portion of the data is transferred to the embedded processor. The data set is parsed by the data set parser logic and one or more relevant data units of the data set are stored in the registers of the embedded processor 1050.

The host interface processor directs a command to the embedded processor by writing to one or more embedded processor registers, for example, a command register 1055. For example, the host interface processor may command the embedded processor to begin execution of the previously downloaded program of instructions at a location associated with a particular instruction sequence. The embedded processor executes one or more instruction sequences beginning at the location specified by the host interface processor 1056. The instruction sequences operate using the relevant data units stored in registers of the embedded processor. Execution of the instruction sequences causes a value associated with the classification of the data set to be written to an exit register of the embedded processor the data set 1060.

In one configuration, the embedded processor may interrupt the host interface processor when the data set analysis is complete and the exit register is loaded. The host interface processor reads the value stored in the exit register to determine the location of the classification of the data set 1070. The host interface processor retrieves the results of the classification from the embedded processor and processes the data set according to the classification of the data set 1080.

The methods of the present invention may be used to accomplish various tasks with regard to data set analysis. The processes discussed above provide a flexible framework for data set analysis and may be used to accomplish a number of data processing functions. An exemplary set of data processing functions that may be implemented using the methods and systems of the present invention include: IP packet filtering, virus detection, private network address translation, content filtering, text string searching and data security functions. In one implementation, one or more of the exemplary set of functions may be provided by parallel embedded processors coupled to the host interface processor. Each embedded processor may execute a set of rules consistent with the data processing function assigned to the particular embedded processor.

Figure 11:
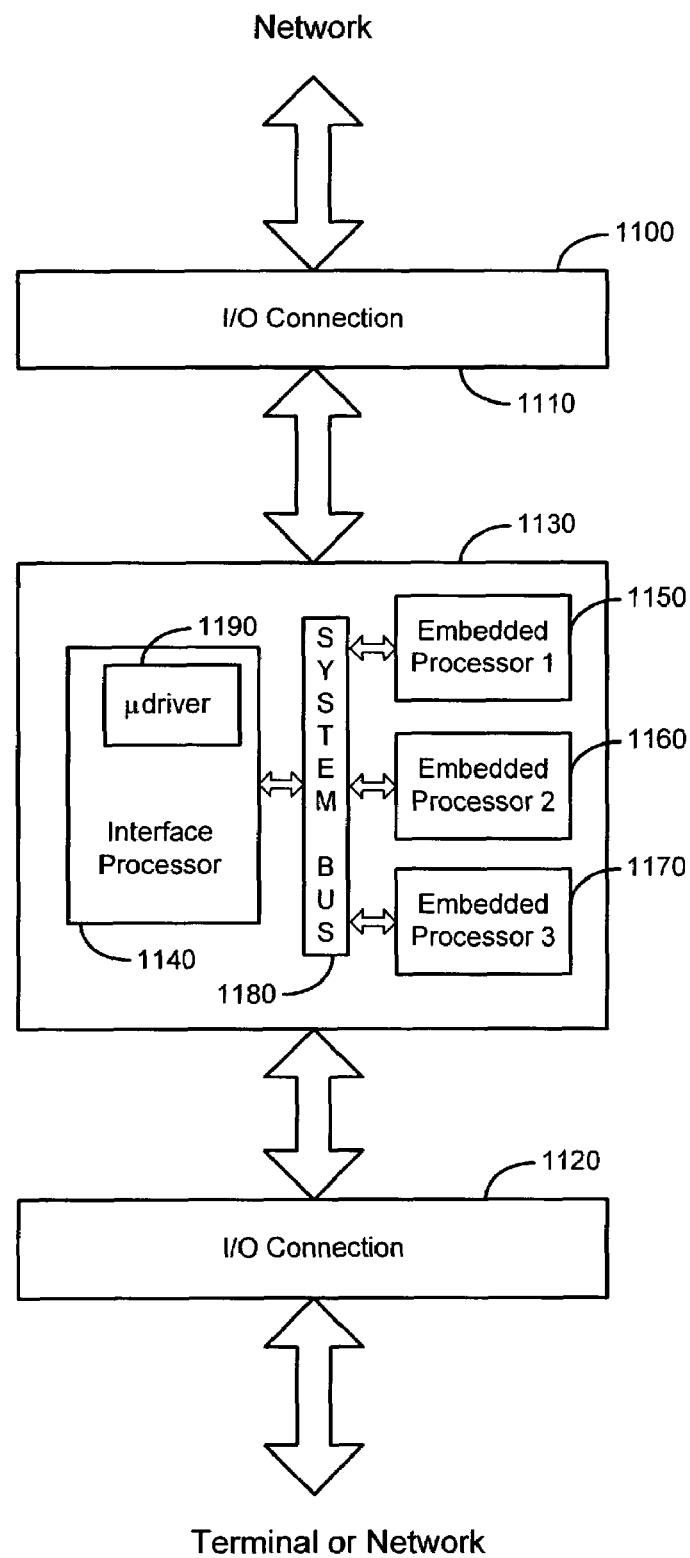
FIG. 11 is a block diagram of an interface using three parallel embedded processors for classifying data sets in accordance with a method of the invention.

A block diagram of an interface system using a number of embedded processors operating in parallel to perform various data processing tasks is illustrated in FIG. 11. The interface 1100 may be interposed between a wide area network, such as the internet, and a private terminal or network through appropriate I/O connections 1110, 1120. The majority of the interface circuitry 1130 may be incorporated on one or more integrated circuits coupled between the I/O connections 1110, 1120. In accordance with one embodiment of the invention, the interface circuitry 1130 includes a host interface processor 1140 and several embedded processors 1150, 1160, 1170 coupled to the host interface processor through a system bus 1180. For example, the host interface processor 1140 may be implemented using an ARM or MIPS processor core and may be coupled to the embedded processors 1150, 1160, 1170 through a high speed parallel system bus. The host interface processor 1140 and the embedded processors 1150, 1160, 1170 are arranged to operate in parallel. In this configuration, the host interface processor 1140 performs the bulk of data processing tasks. The embedded processors 1150, 1160, 1170 offload tasks of data set analysis and classification from the host interface processor 1140, thereby freeing the host interface processor 1140 from a large portion of the processing overhead associated with these operations.

For example, embedded processor-1 1150, may search data set headers to determine if a particular data set originates from a source that has been designated as a secure source. Embedded processor-2 1160 may be programmed implement a content filter. Embedded processor-2 1160 may provide a content filter for particular data units, a sequence of data units or text strings as commanded by the host interface processor. Embedded processor-3 1170 may search the data set for one or more data units indicative of a computer virus. Although all of the data processing tasks of content filtering, security, and virus detection may alternately be implemented in an interface system using only a single embedded processor in accordance with an embodiment of the invention, these data processing tasks are used in this example embodiment to illustrate the operation of an interface system using three embedded processors operating in parallel. Although three embedded processors are used for this example, any number of embedded processors may be used, Furthermore, other data analysis tasks may be performed by one or more of embedded processors 1-3 1150, 1160, 1170, or by additional parallel-connected embedded processors.

The host interface processor 1140 includes a microdriver 1190, for managing the one or more embedded processors 1150, 1160, 1170 coupled to the host interface processor 1140. The microdriver 1190 operating within the host interface processor 1140 provides an interface for controlling the operation of the embedded processors 1150, 1160, 1170. The microdriver 1190 is configured to control the communication between the one or more embedded processors 1150, 1160, 1170 and the host interface processor 1140, and to manage the rule sets applied by the embedded processors 1150, 1160, 1170. For example, the microdriver 1190 may initiate and terminate the use of an embedded processor 1150, 1160, 1170, copy embedded processor registers to the host interface processor 1140 or overwrite the contents of the embedded processor registers with alternate values. The microdriver 1190 may perform other operations as more fully described in relation to FIG. 2 above.

Figure 12:
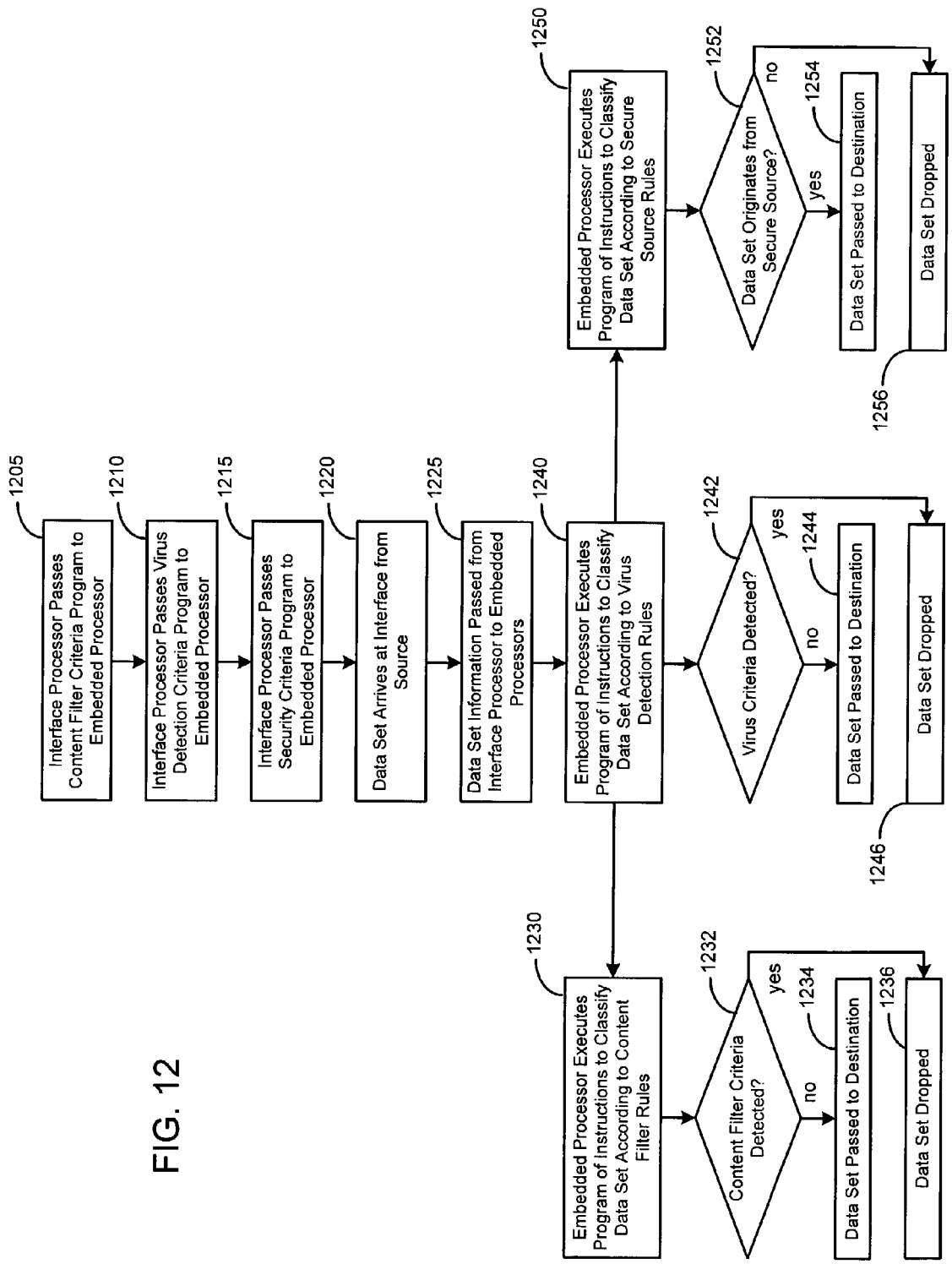
FIG. 12 is a method of classifying data sets using multiple parallel embedded processors in accordance with an embodiment of the invention.

A method of performing the operations of content filtering, virus detection and source security using the parallel embedded processor described in connection with FIG. 12 is illustrated in the flowchart of FIG. 12. Rule sets for content filtering, virus detection and source security are represented by programs of instructions. The program of instructions representing rules used to provide content filtering are passed from the host interface processor to embedded processor-1 1205. Embedded processor-2 is passed a program of instructions to implement virus detection 1210. A program of instructions designed to classify a data set according to whether the originator of the data set has been designated a secure source is passed to from the host interface processor to embedded processor-3 1215.

When the data set arrives at the interface from a source computer 1220, data set information is passed from the host interface processor to the embedded processors 1225. The host interface processor sends commands to each of the embedded processors to commence execution of one or more instruction sequences stored in the embedded processors to analyze the data set. The embedded processors operate in parallel to classify the data set. Each embedded processor parses the data set to extract and store relevant values of the data set in one or more registers of the embedded processor.

Embedded processor-1 executes a program of instructions designed to classify the data set in accordance with content filtering rules 1230. After the data set is classified according to content filtering rules, the results of the classification are passed to the host interface processor. If the content filter criteria is not detected 1232, the host interface processor passes the data set to the destination terminal 1234. If the content filter criteria is detected, the host interface processor drops the data set 1236.

Embedded processor-2 executes a program of instructions designed to classify the data set in accordance with virus detection rules 1240. Following execution of the program of instructions, the results of the classification are passed to the host interface processor. If one or more data units consistent with the presence of a virus are not detected 1242, the host interface processor passes the data set to the destination terminal 1244. If one or more data units consistent with the presence of a virus are detected, the host interface processor drops the data set 1246.

Embedded processor-3 executes a program of instructions designed to exclude data sets originating from sources that have been designated as insecure or undesirable sources 1250. Following execution of the program of instruction, the results of the classification are passed to the host interface processor. If a source address associated with a secure source is detected 1262, the host interface processor passes the data set to the destination terminal 1264. If a source address associated with an insecure source is detected, the host interface processor drops the data set 1266.

In a similar manner, a variety of data processing tasks may be performed by one or more embedded processors to offload data set classification tasks from the host interface processor. For each of these tasks, the rules for data set classification are represented in a sequence of machine code instructions stored in the memory of an embedded processor memory. The host interface processor may control the execution of any number of data processing functions through commands to one or more embedded processors performing data set classification. For a more particular specification, reference may be made to the appended documents entitled PAM System Overview, PAM Specification, PAM Microdriver Specification, and Source Code pam.c, filed concurrently herewith and incorporated by reference in their entirety.

Various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. An interface circuit for processing data sets transferred between a source and a destination terminal in accordance with a set of rules, comprising: an interface processor arranged to process each data set according to a classification of the data set; an embedded processor operating in parallel with the interface processor, the embedded processor configured to classify each data set in accordance with the set of rules and provide the result of the classification to the interface processor; and a parallel data bus coupled between the interface processor and the embedded processor, the parallel data bus configured to deliver data sets from the interface processor to the embedded processor and to deliver the result of the classification to the interface processor.

2. The circuit of claim 1, wherein the interface processor is implemented as a processor core.

3. The circuit of claim 1, wherein the interface processor implements a microdriver, the microdriver converting the set of rules into a sequence of machine code instructions executable by the embedded processor for classifying each data set according to the set of rules.

4. The circuit of claim 1, wherein the embedded processor further comprises: a bus interface arranged to couple the embedded processor to the parallel bus; a data set analysis circuit coupled to the bus interface and configured to classify each data set according to the set of rules; and a memory unit coupled to the bus and the data set analysis circuit for storing a program of instructions representing the set of rules to be applied to the data set.

5. The circuit of claim 4, further comprising: a data set parser circuit coupled to the bus interface and arranged to extract relevant data units from each data set; and a plurality of registers coupled to the data set parser circuit and the data set analysis circuit for storing the relevant data units.

6. The circuit of claim 5, wherein the program of instructions representing the set of rules is applied to the relevant data units to classify the data set.

7. The circuit of claim 5, wherein the program of instructions includes one or more comparison instructions applied to the relevant data units stored in one or more of the plurality of registers to classify the data set.

8. The circuit of claim 5, wherein the interface processor controls the transfer of the data set to the data set parser circuit.

9. The circuit of claim 5, wherein the data set is transferred from the interface processor to the data set parser circuit by a direct memory access circuit.

10. The circuit of claim 4, wherein the memory unit is configured to receive a sequence of machine code instructions representing the set of rules transferred to the embedded processor from the interface processor over the bus.

11. The circuit of claim 10, wherein the machine code instructions are updated by the interface processor in response to modification of the set of rules.

12. The circuit of claim 4, wherein the data set analysis circuit includes a very reduced instruction set computer operating in parallel with the interface processor.

13. The circuit of claim 4, wherein the data set analysis circuit receives commands from the interface processor that control execution of the program of instructions.

14. The circuit of claim 4, wherein the program of instructions representing the set of rules to be applied to the data set comprises a series of machine code instructions and the data set analysis circuit is configured to execute the series of machine code instructions to classify the data set.

15. The circuit of claim 14, wherein the interface processor indicates to the embedded processor the starting address for execution of the series of machine code instructions for each data set.

16. The circuit of claim 14, wherein the series of machine code instructions includes a comparison operation using one or more values stored in one or more registers of the embedded processor.

17. The circuit of claim 4, wherein the data set analysis circuit is configured to indicate the result of classifying each data set to the interface processor.

18. The circuit of claim 17, wherein the data set analysis circuit indicates the result of classifying each data set by storing a value in a register accessible by the interface processor through the bus.

19. The circuit of claim 4, wherein the data set analysis circuit executes a sequence of machine code instructions to search for one or more data units in the data set indicative of a computer virus.

20. The circuit of claim 19, wherein the data set analysis circuit, in response to detecting the sequence of data units in the data set indicative of a computer virus, indicates a result of detecting the sequence of data units to the interface processor.

21. The circuit of claim 4, wherein the data set analysis circuit searches for one or more particular text strings in the data set.

22. The circuit of claim 21, wherein the data set analysis circuit, in response to detecting one or more particular text strings in the data set, indicates a result of detecting the one or more particular text strings to the interface processor.

23. The circuit of claim 4, wherein the data set analysis circuit determines if the data set derives from a prohibited source.

24. The circuit of claim 23, wherein the data set analysis circuit, indicates a result of determining the data set derives from a prohibited source to the interface processor in response to determining the data set derives from a prohibited source.

25. A method for processing data sets, comprising: transferring data sets from an interface processor to an embedded processor operating in parallel with the interface processor; classifying the data sets in accordance with a set of rules; providing results of the classifications to the interface processor; and processing the data sets in accordance with the classifications of the data sets.

26. The method of claim 25, further comprising: converting the set of rules into a sequence of machine code instructions executable by the embedded processor; transferring the sequence of machine code instructions from the interface processor to the embedded processor; and executing the sequence of machine code instructions in the embedded processor to classify the data sets.

27. The method of claim 26, further comprising updating the sequence of machine code instructions in accordance with changes in the set of rules.

28. The method of claim 26, wherein executing the sequence of machine code instructions further comprises executing at least one compare instruction.

29. The method of claim 25, further comprising: extracting relevant data units from the data sets; storing the relevant data units; and using the stored relevant data units to classify the data sets.

30. The method of claim 25, wherein transferring data sets from the interface processor to the embedded processor comprises transferring data sets by direct memory access.

31. The method of claim 25, wherein transferring data sets from the interface processor to the embedded processor comprises transferring data sets under the control of the interface processor.

32. The method of claim 25, wherein providing results of the classifications to the interface processor comprises storing a value in a register of the embedded processor accessible by the interface processor.

33. The method of claim 25, wherein processing the data sets comprises processing the data sets in accordance with a set of rules providing virus detection.

34. The method of claim 25, wherein processing the data sets comprises processing the data sets in accordance with a set of rules providing search capability for detecting one or more particular text strings in the data set.

35. The method of claim 25, wherein processing the data sets comprises processing the data sets in accordance with a set of rules providing intrusion detection criteria.

36. The method of claim 25, wherein processing the data sets comprises processing the data sets in accordance with a set of rules providing private network address translation criteria.

37. A system for embedded data set processing, comprising: means for transferring data sets from an interface processor to an embedded processor operating in parallel with the interface processor; means for classifying the data sets in accordance with a set of rules; means for providing results of the classifications to the interface processor; and means for processing the data sets in accordance with the classifications of the data sets.

38. The system of claim 37, further comprising: means for converting the set of rules into a sequence of machine code instructions executable by the embedded processor; means for transferring the sequence of machine code instructions from the interface processor to the embedded processor; and means for executing the sequence of machine code instructions in the embedded processor to classify the data sets.

39. A method for processing data sets according to a set of rules, comprising: providing one or more embedded processors operating in parallel with an interface processor, the embedded processors classifying the data sets according to the set of rules and the interface processor processing the data sets in accordance with the classification of the data sets; representing the set of rules as a one or more instruction sequences; transferring one or more of the instruction sequences from the interface processor to one or more of the embedded processors; passing portions of the data sets from the interface processor to one or more of the embedded processors; extracting relevant data units from the data set portions passed to the one or more of the embedded processors; executing the one or more instruction sequences in the embedded processors to classify the data set, the instruction sequences using the relevant data units; reporting the result of classifying the data sets to the interface processor; and processing the data sets in accordance with the classification of the data sets.

40. The method of claim 39, wherein providing one or more embedded processors comprises providing one or more very reduced instruction set computers.

41. The method of claim 39, wherein representing the set of rules comprises representing the set of rules as machine code instruction sequences executable by the embedded processors.

42. The method of claim 39, wherein passing the portions of the data set to one or more of the embedded processors comprises passing the portions of the data sets from the interface processor to one or more of the embedded processors over a parallel-connected bus.

43. The method of claim 39, wherein extracting relevant data units from the portions of the data sets comprises storing relevant data units in one or more registers of the embedded processors.

44. The method of claim 39, wherein executing the instruction sequences comprises executing a machine code sequence to classify the data set.

45. The method of claim 39, wherein executing the instruction sequences includes executing comparison instructions using one or more values stored in registers of the embedded processors.

46. The method of claim 39, wherein reporting the result of classifying the data sets comprises storing values in registers accessible by the interface processor.

47. The method of claim 39, wherein executing the instruction sequences to classify the data sets comprises searching the portions of the data sets for one or more data units indicative of a computer virus.

48. The method of claim 39, wherein executing the instruction sequences to classify the data sets comprises searching the portions of the data sets for one or more particular data strings.

49. The method of claim 39, wherein executing the instruction sequences to classify the data sets comprises determining if the data sets originate from any of a group of prohibited sources.

50. The method of claim 39, wherein executing the instruction sequences to classify the data sets comprises providing classification of the data sets to implement private network address translation.

51. A system for classifying data sets according to a set of rules, comprising: means for operating one or more embedded processors in parallel with an interface processor, the embedded processors classifying the data sets according to the set of rules and the interface processor processing the data sets in accordance with the classification of the data sets; means for representing the set of rules as a sequence of instructions; means for transferring the sequence of instructions from the interface processor to one or more of the embedded processors; means for passing portions of the data set from the interface processor to one or more of the embedded processors; means for extracting one or more relevant data units from each portion of the data sets passed to one or more of the embedded processors; means for executing the sequence of instructions in one or more of the embedded processors to classify the data set, the sequence of instructions including one or more operations using the relevant data units; means for reporting the results of classifying the data sets to the interface processor; and means for processing the data sets in accordance with the classifications of the data sets.

52. The system of claim 51, further comprising means for representing the set of rules as a machine code instruction sequence.

53. The system of claim 51, further comprising means for storing one or more relevant data units in one or more registers of the embedded processors.

54. The system of claim 51, further comprising means for executing comparison instructions using one or more values stored in registers of the embedded processors.

55. The system of claim 51, further comprising means for storing values in registers accessible by the interface processor.

* * * * *